H. TAUSZKY.
Preparing Grain for Distillation.
No. 96,998.
Patented Nov. 16, 1869.
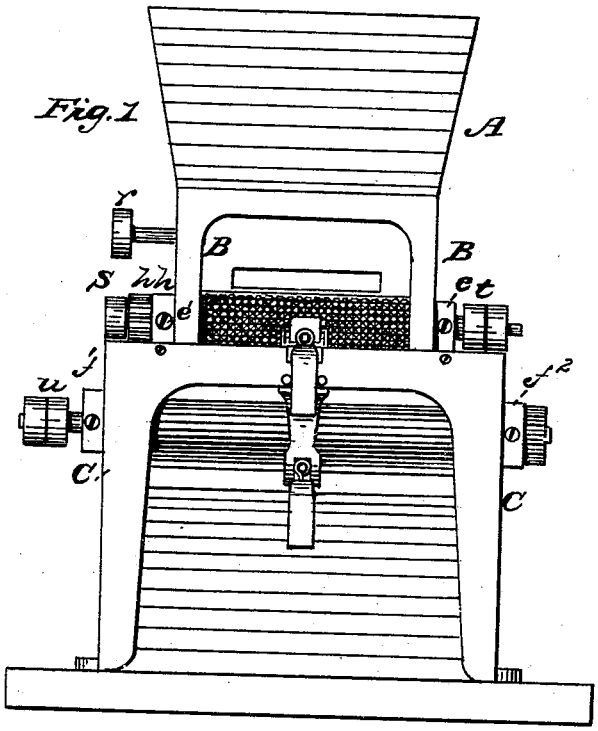
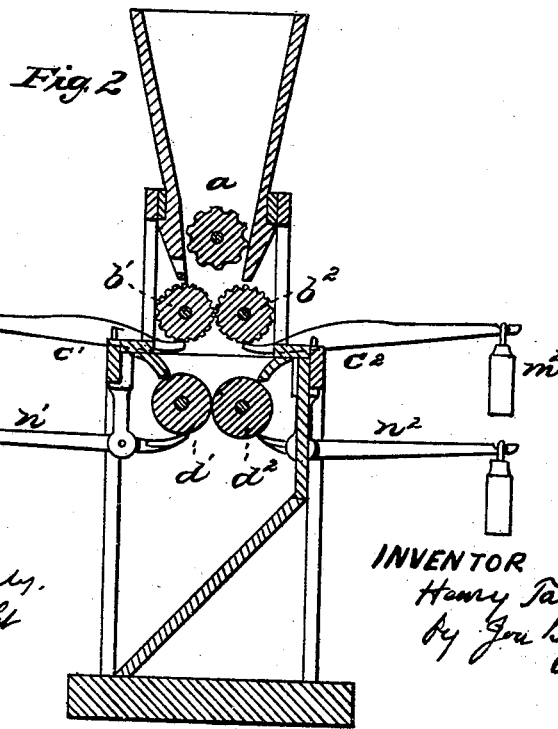

United States Patent Office.

HENRY TAUSZKY, OF NEW YORK, N. Y., ASSIGNOR TO ELI D. BANNISTER AND RUDOLPH TAUSZKY.

Letters Patent No. 96,998, dated November 16, 1869.

IMPROVED PROCESS OF PREPARING GRAIN FOR DISTILLATION.

The Schedule referred to in these Letters Patent and making part of the same.

*To all whom it may concern:*

Be it known that I, HENRY TAUSZKY, of New York city, in the county and State of New York, have invented a new and useful Machine for the Preparation of Grain for the Distillation of Spirits or Whiskey; and I do hereby declare that the following is a full, clear, and exact description thereof, reference being had to the accompanying drawings, and to the letters of reference marked thereon.

The object of this invention is to produce a greater quantity of spirits from a given quantity of grain, and of better quality than by any process known.

The nature of this invention consists in the preparation of grain for, and its pulverization by, the machinery, hereinafter fully described.

The grain to be distilled is first placed in a vat, after which water, heated to a certain degree (100° Fahrenheit) is introduced in sufficient quantity to entirely cover it.

The grain is allowed to remain therein until it attains a certain degree of solvability, say from six to eight hours.

When the grain has reached this state, it is ready to be placed in the machine to be pulverized.

To enable others skilled in the art to make and use my invention, I will proceed to describe its construction and operation.

A is the hopper which receives the grain.

B and C compose the frame-work of the machine.

$a$ is the feeding-roller, which passes through the upper part of frame B, and has parallel furrows cut thereon, whose width corresponds with the size of the grain it receives.

Rollers $b^1$ $b^2$ are placed in the lower part of frame B, and extend into the cam-wheels $h$ $h$. Their surfaces are covered with teeth, which are equidistant from each other, and of regular size, and are intended to gear.

$c^1$ $c^2$ are knives, which prevent the rollers $b^1$ $b^2$ from clogging.

Weights $m^1$ $m^2$ are suspended thereon, to keep them in contact with the rollers $b^1$ $b^2$.

$d^1$ $d^2$ are plane rollers for reducing the grain to its final state. They have knives $n^1$ $n^2$, which have weights attached for the same purpose as the knives $c^1$ $c^2$.

The screws $e^1$ $e^2$ and $f^1$ $f^2$ are for the purpose of regulating the distance between the rollers.

Rollers $a$, $b^1$ $b^2$, and $d^2$, have band-pulleys $r$, $s$, $t$, and $u$, attached without the frame-work, to which the power is applied.

D is a rectangular opening in the frame B, through which to observe the operation of the machinery.

The manner in which the machine operates is as follows, i. e.:

The grain is poured into the hopper A, where it is received by roller $a$, which transfers it to the rollers $b^1$ $b^2$, where it is crushed; from thence it passes to the rollers $d^1$ $d^2$, and is thus reduced to the desired state.

Having thus described my invention,

What I claim, and desire to secure by Letters Patent, is—

1. The process of preparing grain, as and for the purpose set forth.

2. The rollers $b^1$ $b^2$, in combination with roller $a$ and rollers $d^1$ $d^2$, when constructed and arranged substantially as described, and effecting the process specified.

3. In combination with the rollers $b^1$ $b^2$, the knives $c^1$ $c^2$, as and for the purposes herein described.

4. In combination with the rollers $d^1$ $d^2$, the knives $n^1$ $n^2$, as and for the purpose herein described.

HENRY TAUSZKY.

Witnesses:
E. D. BANNISTER,
JO. BECSEY,
W. B. PUTNEY.